United States Patent Office 3,286,044
Patented Nov. 15, 1966

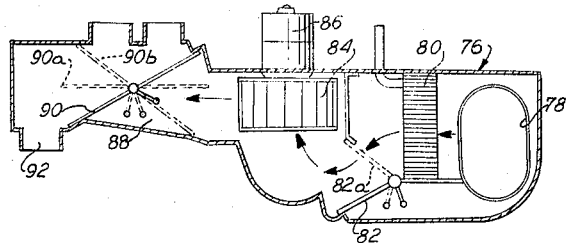
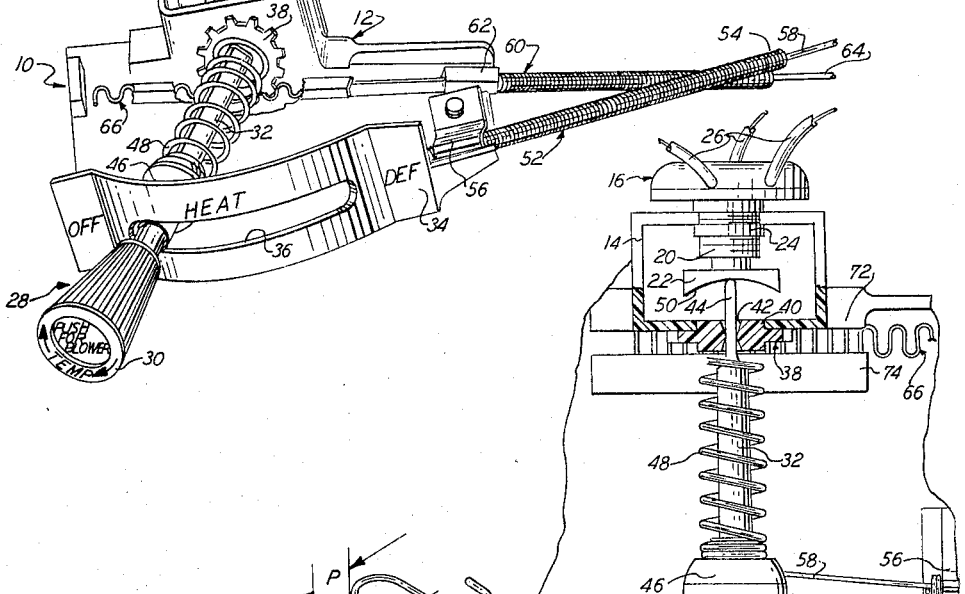
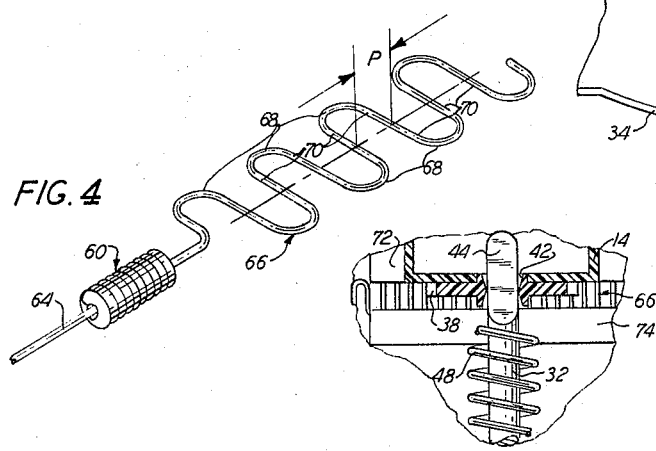

3,286,044
HEATER CONTROL WITH IMPROVED SLIDABLE AND ROTARY MOTION MEANS
David W. Barton, Birmingham, Charles Haddad, Allen Park, and Robert W. Riley, Taylor, Mich., assignors to Ford Motor Company, Dearborn, Mich., a corporation of Delaware
Filed Dec. 10, 1965, Ser. No. 512,966
7 Claims. (Cl. 200—4)

The present invention relates generally to control devices for automotive heaters, and more particularly to a single knob control.

It is not an uncommon complaint for automobile users to be confused by the controls that are provided for regulating the different functions of the automotive heater. This confusion often arises because the driver is presented with a multiplicity of levers and switches which must be moved in some unobvious fashion to direct warm or ventilation air into the passenger compartment or warm air onto the windowshield for defrosting and demisting purposes.

In view of the complexity of prior art devices and the confusion resulting from their use, it is one of the objects of the present invention to provide a control device for an automobile heater that is of extremely simple construction and operation.

It is another object of the present invention to provide a one-knob control system in which a single knob may be pushed, rotated or moved from side to side in order to regulate the various functions of the vehicle heating system.

It is a further object of the present invention to provide a heater control that is of extremely compact construction which permits considerable latitude on the part of the designer in installing the mechanism in the vehicle's instrument panel.

These and other objects of the present invention will become readily apparent upon consideration of the following discussion and the accompanying drawings in which:

FIGURE 1 is a perspective view of a heater control constructed in accordance with the presently preferred embodiment of this invention;

FIGURE 2 is a top plan view partly in section of a portion of the heater control of FIGURE 1;

FIGURE 3 is an enlarged sectional view of a portion of the construction shown in FIGURE 2;

FIGURE 4 is a perspective view showing a portion of one of the control wires used in the construction of FIGURE 1; and FIGURE 5 is a schematic representation of an automotive heater.

Referring now to the drawings for a more detailed description of the present invention, FIGURE 1 illustrates a heater control assembly 10 having a molded plastic housing 12. The housing 12 includes an upstanding box-shaped portion 14 to which an electrical switch 16 is secured. The backside of the box portion 14 is provided with a slot 18. A threaded tubular portion 20 which surrounds a switching element 22 of switch 16 protrudes forwardly through the slot 18. A nut 24 is threaded onto the tubular portion 20 and secures the switch 16 to the box portion 14.

Electrical wires 26 extend from the switch 16 and are adapted to be connected to a heater blower motor and a power source. The motor operates the blower of an automotive heating system. The switch 16 is of a push to operate sequential type. Assuming that the switch is initially in the "off" position when the switching element 22 is pushed inwardly, the switch 16 turns the motor onto its "low" speed range. When the switch 22 is pushed a second time, the motor is operated at "high" speed. When the switching element 22 is pushed for a third time, it is returned to its "off" position.

A control member 28 is provided and has a knob 30 at one end and a shaft 32 extending inwardly from the knob 30. The forward portion of the housing 12 is provided with an upstanding flange 34 that has a generally arcuate configuration in the plan view. A slot 36 extends laterally across the flange 34 and defines a linear path of movement for the outer end of the shaft 32. The outer end of shaft 32 is supported by flange 34 in slot 36. The rearward end of the shaft 32 is supported by a pinion gear 38.

Gear 38 has a hub portion 40 that is rotatably supported in an opening in the box-like support 14. The hub 40 is provided with an axially extending slot 40 having bevelled edges. The rearward end 44 of the shaft 32 is flattened to form a spatula-like construction. The spatula end 44 is slidably fitted into the slot 40 to provide a driving engagement.

A retaining member 46 is slidably disposed on the shaft 32 behind the flange 34. A coil spring 48 encircles the shank of the shaft 32 and has one end pressing against the retainer 46 and its other end pressing against the pinion gear 38. The exposed end of the switching element 22 has an arcuate surface 50 that is contacted by the tip of the shaft end 44. When the control knob 30 is pushed inwardly, the element 22 is depressed to operate the switch 16.

Due to the bevelling of the edges of the slot 42 in the pinion gear 38, a universal support is provided for the shaft 32 that permits the control knob 30 to be moved laterally along the slot 36. Push button operation of the switch 16 by the control knob 30 is possible at any lateral position of the knob.

A Bowden wire assembly 52 has an outer casing 54 that is secured to the housing 12 by a clamp 56. A stiff control wire 58 is slidably received within the casing 54 and has an exposed end that is connected to the retaining member 46. With this arrangement, the control knob 30 may be moved laterally along the slot 36 to extend or retract the control wire 58. It is intended that the control wire 58 be connected to a valve element in the air passage of an automotive heating system.

A Bowden wire assembly 60 having a slidable control wire 64 is secured to the housing 12 by a clamp 62. The end 66 of the control wire 64 is bent into the serpentine configuration illustrated in FIGURE 4. The serpentine end 66 comprises a series of loops 68 that are connected by straight portions 70. The straight portions 70 are spaced apart a distance P that is equal to the pitch of the pinion gear 38. The serpentine end 66 of the control wire 64 slides within guide members 72 and 74 formed in the housing 12 and is in mesh with the teeth of the pinion gear 38. With this construction, the knob 30 may be rotated in either a clockwise or counterclockwise direction and control wire 64 is thereby retracted or extended. Rotation of the knob 30 is possible regardless of the position of the shaft 32 along with slot 36 due to the universal connection between the spatula end 44 and the slot 42 of the gear 38.

FIGURE 5 schematically illustrates an automotive heater that is constructed to be controlled by the control mechanism 10 of FIGURE 1. The heater assembly 76 is fabricated with a sheet metal or plastic housing. Air enters the heater 76 through an inlet opening 78. A heater core 80 contains warm engine coolant fluid and is a heat exchanger for warming the cool inlet air. A blend air valve 82 constitutes the temperature control element of the heater 76 and it functions by controlling the percentage of inlet air which passes through the heater core 80. When the valve 82 is in the solid line position of FIGURE 5, all of the inlet air passes through the heater core 80. When it is moved to the dotted-line position 82a, all of the inlet air bypasses the heater core 80. It is possible to place the blend air valve 82 in an intermediate position so that there is a blending of air passing through the heater core 80 and cool air which bypasses the heater core 80. The control wire 64 is connected to the valve 82 so that rotation of the knob 30 controls the position of the valve 82 and the temperature of the air.

The blended air next flows through a blower 84 that is driven by a motor 86 and to an outlet plenum chamber 88. A pivotally mounted door 90 is situated in the chamber 88 in proximity to a heater outlet 92 and defroster outlets 94. The control wire 58 is connected to the valve 90. When the control knob 30 is in the left-hand "OFF" position illustrated in FIGURE 1, the control wire 58 is retracted and the valve 90 seals the outlet from the blower 84. In this position, no air flows through the heater 76. When the control knob 30 is moved to the middle "HEAT" position, the valve 90 assumes a central position 90a where air flows through the heater outlet 92 near the feet of the vehicle operator. Some air will also pass through the defroster outlets 94. When the control knob 30 is moved to the right-hand "DEF." position, the valve 90 is in the position 90b. The heater outlets 92 are closed and 100 percent of the warm air is directed through the defroster outlets 94.

The velocity of air flowing through the heater 76 is controlled by the motor 86 which is connected to a power source by means of the switch wires 26. The knob 30 may be pushed to actuate the switch 16 which, in turn, controls the motor 86.

In summary, the present invention provides a one-knob heater control which performs three functions. It controls air distribution, air temperature and air velocity. Air distribution is controlled by sliding the knob 30 along the slot 36 to regulate the position of valve 90. Air temperature is controlled by rotating the knob 30 which, in turn, controls the position of the blend air valve 82 at the inlet to the blower 84. Air velocity is controlled by regulating the speed of the blower motor 86. Pushing the knob 30 inwardly operates the sequential switch 16 which controls the blower motor speeds.

The foregoing description presents the presently preferred embodiment of this invention. Alterations and modifications may occur to those skilled in the art that will come within the scope and spirit of the following claims.

1. A control mechanism comprising:
 a control shaft,
 a housing having a portion defining a linear path for one end of said control shaft,
 an electrical switch connected to said housing and having a switching element engageable by said control shaft,
 said switching element being constructed to actuate said switch upon axial movement of said control shaft,
 a first motion transfer device engaging said control shaft,
 a first actuator connected to said first motion transfer device,
 said first motion transfer device being constructed to transfer rotary motion of said control shaft to said first actuator,
 a second motion transfer device engaging said control shaft,
 a second actuator connected to said second motion transfer device,
 said second motion transfer device being constructed to transfer movement of said control shaft along the linear path defined by said housing portion to said second actuator.

2. The control mechanism of claim 1 and including:
 said switching element engaging the other end of said control shaft,
 said control shaft being axially displaceable to actuate said electrical switch,
 said first motion transfer device comprising a member mounted on said housing for angular movement,
 said shaft being connected to said member for joint angular movement,
 said first actuator comprising a first Bowden wire assembly having an axially movable control wire,
 means constructed for providing a driving engagement between said control wire and said member.

3. The control mechanism of claim 1 and including:
 said first motion transfer device comprising a member mounted on said housing for angular movement,
 said shaft being connected to said member for joint angular movement,
 said first actuator comprising a first Bowden wire assembly having an axially movable control wire,
 means constructed for providing a driving engagement between said control wire and said member.

4. The control mechanism of claim 1 and including:
 said first motion transfer device comprising a member mounted on said housing for angular movement,
 said shaft being connected to said member for joint angular movement,
 said first actuator comprising a first Bowden wire assembly having an axially movable control wire,
 means constructed for providing a driving engagement between said control wire and said member,
 said second motion transfer device comprising a second member slidably engaging said shaft,
 said second actuator comprising a second Bowden wire assembly having a control wire connected to said second member.

5. The control mechanism of claim 1 and including:
 said first motion transfer device comprising a gear rotatably mounted on said housing,
 said gear having a centrally situated slot,
 said other end of said shaft having a spatula configuration and slidably mounted in said slot,
 said first actuator comprising a first Bowden wire assembly having an axially movable control wire,
 a portion of said housing defining a linear path for the movement of said control wire,
 means providing a driving engagement between said control wire and said gear.

6. The control mechanism of claim 1 and including:
 said first motion transfer device comprising a gear rotatably mounted on said housing,
 said gear having a centrally situated slot,
 said shaft having a portion slidably mounted in said slot,
 said first actuator comprising a first Bowden wire assembly having an axially movable control wire,
 a portion of said housing defining a linear path for the movement of said control wire,
 means providing a driving engagement between said control wire and said gear.

7. The control mechanism of claim 1 and including:
 said first motion transfer device comprising a gear rotatably mounted on said housing,
 said gear having a centrally situated slot,
 said shaft having a portion slidably mounted in said slot, said first actuator comprising a first Bowden wire assembly having an axially movable control wire,
a portion of said housing defining a linear path for the movement of said control wire,
means providing a driving engagement between said control wire and said gear,
said second motion transfer device comprising a member slidably engaging said control shaft,
said second actuator comprising a second Bowden wire assembly having a control wire connected to said member.

References Cited by the Examiner
UNITED STATES PATENTS

| | | | |
|---|---|---|---|
| 1,839,908 | 5/1932 | Weatherhead | 174—503 |
| 2,868,967 | 1/1959 | Poppa et al. | 200—18 X |

ROBERT K. SCHAEFER, *Primary Examiner.*